United States Patent [19]

Ngoc

[11] Patent Number: 5,686,147
[45] Date of Patent: Nov. 11, 1997

US005686147A

[54] PLASTISOL COMPOSITION

[75] Inventor: Hung Dang Ngoc, Limeil Brevannes, France

[73] Assignee: The Goodyear Tire & Rubber Company, Akron, Ohio

[21] Appl. No.: 746,949

[22] Filed: Nov. 18, 1996

[51] Int. Cl.$^6$ .............................. B05D 3/02; B05D 1/18
[52] U.S. Cl. .................. 427/385.5; 427/375; 427/430.1
[58] Field of Search .............................. 427/375, 430.1, 427/385.5

[56] References Cited

U.S. PATENT DOCUMENTS

| | | | |
|---|---|---|---|
| 3,870,015 | 3/1975 | Brown et al. | 427/430.1 |
| 5,362,787 | 11/1994 | Ngoc et al. | 524/297 |
| 5,552,468 | 9/1996 | Ngoc et al. | 524/297 |

*Primary Examiner*—Peter A. Szekely
*Attorney, Agent, or Firm*—Alvin T. Rockhill

[57] ABSTRACT

This invention discloses a process for applying a rubbery coating to a substrate which comprises: (1) dipping the substrate into a plastisol composition in a manner whereby the plastisol composition is applied to the surface of the substrate, wherein the plastisol composition is comprised of (i) polyvinyl chloride, (ii) from about 70 to about 100 parts of a plasticizer per 100 parts of the polyvinylchloride, (iii) from about 1 to about 3 parts of a stabilizer and (iv) from about 10 to about 30 parts of a highly crosslinked nitrile rubber composition per 100 parts of the polyvinyl chloride, wherein the highly crosslinked nitrile rubber has repeat units which are derived from (a) 1,3-butadiene, (b) acrylonitrile and (c) a crosslinking agent, and wherein said highly crosslinked nitrile rubber has a Mooney viscosity of about 50 to about 120, a swelling index of less than about 10 percent, a mill shrinkage of less than 10 percent and a gel content of greater than 90 percent; (2) removing the substrate from the plastisol composition to produce a plastisol coated substrate; (3) heating the plastisol-coated substrate to a temperature which is within the range of about 150° C. to about 200° C. for a period which is sufficient to fuse the plastisol composition to the substrate producing a rubber-coated substrate. The highly crosslinked rubber compositions of this invention can be utilized in slush molding applications.

20 Claims, No Drawings

PLASTISOL COMPOSITION

BACKGROUND OF THE INVENTION

Plastisols are dispersions of homopolymers and vinyl acetate copolymers of vinyl chloride in conventional polyvinyl chloride plasticizers. The relative amounts of the polyvinylchloride (PVC) and plasticizer is adjusted to attain a paste of the desired consistency which can be utilized in coating a wide variety of substrates. For example, plastisols are widely used as coatings for gloves, shoes, boots, tool handles and wire goods, such as dishwasher racks, dishdrainer baskets and napkin holders.

Dipping procedures are used to coat the plastisol onto the surface of such articles. This is normally accomplished by dipping the substrate into a bath of the plastisol paste. Upon heating, gelation occurs which fuses the plastisol into a solid coating on the surface of the substrate. This heating of the plastisol can be carried out by preheating the substrate prior to dipping (hot dipping) or the substrate can be heated after being dipped into the plastisol paste (cold dipping). In either case, a desired quantity of the plastisol is coated onto the surface of the substrate and fused thereto. As a specific example, a fabric glove substrate can be dipped into a plastisol to apply a rubbery coating to the outer surface of the glove.

Plastisols can also be compounded for use in slush molding applications. In conventional slush molding applications, the plastisol is injected into a heated mold and is fused in the shape of the mold after being heated by the sides of the hot mold. Slush-molding is particularly useful in manufacturing hollow articles since the wall thickness of the article can be controlled by adjusting the amount of plastisol injected into the mold.

Over the years, attempts have been made to improve the physical properties of articles made with plastisols by incorporating a small amount of various rubbers into the plastisol composition. For instance, attempts to improve the oil resistance of plastisol-coated articles have been made by including a small amount of nitrile rubber in the plastisol composition. However, such attempts to incorporate conventional rubbers into plastisol compositions have not been successful because the rubbers have caused an unacceptable increase in the viscosity of the plastisol composition. This increase in viscosity destroys the pasty consistency of the plastisol and renders it unacceptable for dipping applications.

U.S. Pat. No. 5,362,787 and U.S. Pat. No. 5,552,468 disclose a highly crosslinked nitrile rubber composition which can be blended with polyvinyl chloride to make compositions having excellent characteristics for seals and gaskets including dimensional stability, low compression set and outstanding sealing characteristics, said highly crosslinked nitrile rubber composition being comprised of (1) a highly crosslinked nitrile rubber having repeat units which are derived from (a) 1,3-butadiene, (b) acrylonitrile and (c) a crosslinking agent, wherein said highly crosslinked nitrile rubber has a Mooney viscosity of about 50 to about 120, a swelling index of less than about 10 percent, a mill shrinkage of less than 10 percent and a gel content of greater than 90 percent; and (2) from about 1 to about 30 phr of a plasticizer.

U.S. Pat. No. 5,362,787 and U.S. Pat. No. 5,552,468 further disclose a body seal for automotive applications which is comprised of a blend of (1) polyvinyl chloride, (2) from about 20 to about 120 parts of a plasticizer per 100 parts of the polyvinylchloride, (3) from about 1 to about 3 parts of a stabilizer and (4) from about 5 to about 300 parts of a highly crosslinked nitrile rubber composition per 100 parts of the polyvinyl chloride, wherein the highly crosslinked nitrile rubber composition is comprised of a highly crosslinked nitrile rubber and from about 1 to about 30 parts of a plasticizer, wherein the highly crosslinked nitrile rubber has repeat units which are derived from (a) 1,3-butadiene, (b) acrylonitrile and (c) a crosslinking agent, and wherein said highly crosslinked nitrile rubber has a Mooney viscosity of about 50 to about 120, a swelling index of less than about 10 percent, a mill shrinkage of less than 10 percent and a gel content of greater than 90 percent.

SUMMARY OF THE INVENTION

It has been found that certain highly crosslinked nitrile rubbers can be incorporated into plastisol compositions without experiencing an unacceptable increase in the viscosity of the plastisol paste. By including such highly crosslinked nitrile rubbers in the plastisol composition, the fluid resistance, slip resistance and low temperature flexibility of articles of manufacture made with the plastisol can be improved. For instance, the nitrile rubber provides the plastisol with better fluid resistance which helps to keep the plasticizer from being extracted from the plastisol. This makes the utilization of articles manufactured with plastisols more viable in applications where the article may come in contact with oils and/or other solvents. The presence of the highly crosslinked nitrile rubber also provides the article with better low temperature flexibility which increases the number of applications where plastisols can be used. Improving the slip resistance of the plastisol makes its utilization in articles, such as gloves, shoes and boots more desirable.

This invention more specifically discloses a plastisol composition which can be utilized in manufacturing articles having good fluid resistance, low temperature flexibility and slip resistance, said plastisol composition being comprised of (1) polyvinyl chloride, (2) from about 70 to about 100 parts of a plasticizer per 100 parts of the polyvinylchloride, (3) from about 1 to about 3 parts of a stabilizer and (4) from about 10 to about 30 parts of a highly crosslinked nitrile rubber composition per 100 parts of the polyvinyl chloride, wherein the highly crosslinked nitrile rubber has repeat units which are derived from (a) 1,3-butadiene, (b) acrylonitrile and (c) a crosslinking agent, and wherein said highly crosslinked nitrile rubber has a Mooney viscosity of about 50 to about 120, a swelling index of less than about 10 percent, a mill shrinkage of less than 10 percent and a gel content of greater than 90 percent.

The present invention also discloses a slush molding composition which can be utilized in manufacturing articles having good fluid resistance, low temperature flexibility and slip resistance, said shush molding composition being comprised of (1) polyvinyl chloride, (2) from about 40 to about 65 parts of a plasticizer per 100 parts of the polyvinylchloride, (3) from about 1 to about 3 parts of a stabilizer and (4) from about 10 to about 15 parts of a highly crosslinked nitrile rubber composition per 100 parts of the polyvinyl chloride, wherein the highly crosslinked nitrile rubber has repeat units which are derived from (a) 1,3-butadiene, (b) acrylonitrile and (c) a crosslinking agent, and wherein said highly crosslinked nitrile rubber has a Mooney viscosity of about 50 to about 120, a swelling index of less than about 10 percent, a mill shrinkage of less than 10 percent and a gel content of greater than 90 percent.

The present invention further reveals a process for applying a rubbery coating to a substrate which comprises: (1)

dipping the substrate into a plastisol composition in a manner whereby the plastisol composition is applied to the surface of the substrate, wherein the plastisol composition is comprised of (i) polyvinyl chloride, (ii) from about 70 to about 100 parts of a plasticizer per 100 parts of the polyvinylchloride, (iii) from about 1 to about 3 parts of a stabilizer and (iv) from about 10 to about 30 parts of a highly-crosslinked nitrile rubber composition per 100 parts of the polyvinyl chloride, wherein the highly crosslinked nitrile rubber has repeat units which are derived from (a) 1,3-butadiene, (b) acrylonitrile and (c) a crosslinking agent, and wherein said highly crosslinked nitrile rubber has a Mooney viscosity of about 50 to about 120, a swelling index of less than about 10 percent, a mill shrinkage of less than 10 percent and a gel content of greater than 90 percent; (2) removing the substrate from the plastisol composition to produce a plastisol-coated substrate; (3) heating the plastisol-coated substrate to a temperature which is within the range of about 150° C. to about 200° C. for a period which is sufficient to fuse the plastisol composition to the substrate producing a rubber-coated substrate.

The present invention also discloses a process for producing a hollow rubber article which comprises (1) injecting a slush molding compound into a mold, wherein the slush molding compound is comprised of (i) polyvinyl chloride, (ii) from about 40 to about 65 parts of a plasticizer per 100 parts of the polyvinylchloride, (iii) from about 1 to about 3 parts of a stabilizer and (iv) from about 10 to about 15 parts of a highly crosslinked nitrile rubber composition per 100 parts of the polyvinyl chloride, wherein the highly crosslinked nitrile rubber has repeat units which are derived from (a) 1,3-butadiene, (b) acrylonitrile and (c) a crosslinking agent, and wherein said highly crosslinked nitrile rubber has a Mooney viscosity of about 50 to about 120, a swelling index of less than about 10 percent, a mill shrinkage of less than 10 percent and a gel content of greater than 90 percent; (2) maintaining the mold at an elevated temperature for a period of time which is sufficient for the slush molding compound to be fused into the shape of the desired hollow article; (3) removing the hollow rubber article from the mold.

The present invention further reveals a process for applying a rubbery coating to a substrate which comprises: (1) dipping the substrate into a bath of the plastisol composition in a manner whereby the plastisol composition comes into contact with a hot surface of the substrate, wherein the plastisol composition is comprised of (i) polyvinyl chloride, (ii) from about 70 to about 100 parts of a plasticizer per 100 parts of the polyvinylchloride, (iii) from about 1 to about 3 parts of a stabilizer and (iv) from about 10 to about 30 parts of a highly crosslinked nitrile rubber composition per 100 parts of the polyvinyl chloride, wherein the highly crosslinked nitrile rubber has repeat units which are derived from (a) 1,3-butadiene, (b) acrylonitrile and (c) a crosslinking agent, and wherein said highly crosslinked nitrile rubber has a Mooney viscosity of about 50 to about 120, a swelling index of less than about 10 percent, a mill shrinkage of less than 10 percent and a gel content of greater than 90 percent; (2) allowing the plastisol to remain in contact with the hot surface of the substrate for a period which is sufficient to fuse the plastisol composition to the substrate producing a rubber-coated substrate; (3) removing the rubber-coated substrate from the plastisol bath; and (4) allowing the rubber-coated substrate to cool to ambient temperature after the desired degree of fusing has been attained.

DETAILED DESCRIPTION OF THE INVENTION

The highly crosslinked nitrile rubbers utilized in the practice of this invention are synthesized utilizing a free radical emulsion polymerization technique. These highly crosslinked nitrile rubbers are comprised of repeat units which are derived from (a) 1,3-butadiene, (b) acrylonitrile and (c) a crosslinking agent. The crosslinking agent is typically a multi-functional acrylate, a multi-functional methacrylate or divinylbenzene. Some specific examples of crosslinking agents which can be used include ethylene glycol methacrylate, trimethylol propane trimethacrylate (TRIM), divinylbenzene (DVB) and 1,4-butanediol dimethacrylate.

Technically, the highly crosslinked nitrile rubbers of this invention contain repeat units (chain linkages) which are derived from (a) 1,3-butadiene, (b) acrylonitrile and (c) a crosslinking agent. These repeat units differ from the monomers that they were derived from in that they contain one less carbon-carbon double bond than is present in the respective monomer. In other words, a carbon-to-carbon double bond is consumed during the polymerization of the monomer into a repeat unit in the rubbery polymer. Thus, in saying that the rubbery polymer contains various monomers in actuality means that it contains repeat units which are derived from those monomers.

The highly crosslinked nitrile rubbers of this invention will normally contain (a) from about 45 weight percent to about 79 weight percent butadiene, (b) from about 20 weight percent to about 50 weight percent acrylonitrile and (c) from about 0.5 weight percent to about 5 weight percent of a crosslinking agent. Such highly crosslinked nitrile rubbers will preferably contain (a) from about 58 weight percent to about 71 weight percent butadiene, (b) from about 28 weight percent to about 38 weight percent acrylonitrile and (c) from about 1 weight percent to about 4 weight percent of the crosslinking agent. The highly crosslinked nitrile rubber will more preferably contain from about 1.5 weight percent to about 3.5 weight percent of the crosslinking agent. The percentages reported in this paragraph are based upon the total weight of the highly crosslinked nitrile rubber.

The preferred amount of crosslinking agent will vary with the polymerization technique employed in synthesizing the highly crosslinked nitrile rubber. As a general rule, higher levels of the crosslinking agent are needed at lower polymerization temperatures. By the same token, lower levels of the crosslinking agent are needed in cases where higher polymerization temperatures are employed. The percentages reported in this paragraph are based upon the total weight of the highly crosslinked nitrile rubber.

A wide variety of crosslinking agents can be utilized in carrying out the polymerizations of this invention. Some representative examples of crosslinking agents which can be utilized include difunctional acrylates, difunctional methacrylates, trifunctional acrylates, trifunctional methacrylates and divinylbenzene.

The highly crosslinked nitrile rubbers of the present invention are normally synthesized in an aqueous reaction medium by utilizing a free radical polymerization technique. Optionally, redox initiator systems can be employed in the synthesis of the highly crosslinked nitrile rubber. The reaction mixture utilized in such free radical emulsion polymerization techniques is comprised of water, 1,3-butadiene monomer, acrylonitrile monomer, a suitable free radical initiator, a crosslinking agent, a chain modifier and one or more emulsifying agents.

The modifier will normally be a mercaptan, such as t-dodecylmercaptan. The chain modifier will normally be present in an amount which is within the range of about 0.1 phm to 1 phm (parts by weight per 100 parts by weight of monomer). At low polymerization temperatures, relatively low amounts of the modifier are required. At high polymerization temperatures, higher amounts of the modifier are required. The modifier level can be adjusted to obtain the desired rubber Mooney viscosity.

The reaction mixture utilized in this polymerization technique will normally contain from about 10 weight percent to about 80 weight percent monomers (1,3-butadiene, Acrylonitrile and the crosslinking agent), based upon the total weight of the reaction mixture. The reaction mixture will preferably contain from about 20 weight percent to about 70 weight percent monomers and will more preferably contain from about 30 weight percent to about 50 weight percent monomers.

The emulsifiers used in the polymerization of such polymers may be charged at the outset of the polymerization or may be added incrementally or by proportioning as the reaction proceeds. Generally, anionic emulsifier systems provide good results; however, any of the general types of anionic, cationic or nonionic emulsifiers may be employed in the polymerization.

Generally, from about 1 to about 6 phm (parts by weight per 100 parts by weight of monomer) of the emulsifier is utilized in preparing the aqueous reaction mixture utilized in the emulsion polymerization technique. It has been determined that the use of less than about 1 phm of surfactant can lead to latex instability. On the other hand, the utilization of more than about 6 phm of surfactant can lead to isolation problems. In most cases, it will be preferred to utilize from about 2 phm to about 4 phm of the emulsifier. The precise amount of emulsifier required in order to attain optimal results will, of course, vary with the specific emulsifier being used and with the monomer ratios being employed. However, persons skilled in the art will be able to easily ascertain the specific amount of emulsifier required in order to attain optimal results.

Among the anionic emulsifiers that can be employed in emulsion polymerizations are fatty acids and their alkali metal soaps such as caprylic acid, capric acid, pelargonic acid, lauric acid, undecyclic acid, myristic acid, palmitic acid, margaric acid, stearic acid, arachidic acid and the like; amine soaps of fatty acids such as those formed from ammonia, mono- and dialkyl amines, substitute hydrazines, guanidine and various low molecular weight diamines; chain-substituted derivatives of fatty acids such as those having alkyl substituents; napthenic acids and their soaps and the like; sulfuric esters and their salts, such as the tallow alcohol sulfates, coconut alcohol sulfates, fatty alcohol sulfates, such as oleyl sulfate, sodium lauryl sulfate and the like; sterol sulfates, sulfates of alkylcyclohexanols, sulfation products of lower polymers of ethylene as $C_{10}$ to $C_{20}$ straight chain olefins and other hydrocarbon mixtures, sulfuric esters of aliphatic and aromatic alcohols having intermediate linkages, such as ether, ester or amide groups such as alkylbenzyl (polyethyleneoxy) alcohols, the sodium salt of tridecyl ether sulfate; alkane sulfonates, esters and salts, such as alkylchlorosulfonates with the general formula $RSO_2Cl$, wherein R is an alkyl group having from 1 to 20 carbon atoms and alkylsulfonates with the general formula $RSO_2$—OH, wherein R is an alkyl group having from 1 to 20 carbon atoms; sulfonates with intermediate linkages such as ester and ester-linked sulfonates such as those having the formula $RCOOC_2H_4SO_3H$ and $ROOC—CH_2—SO_3H$, wherein R is an alkyl group having from 1 to 20 carbon atoms such as dialkyl sulfosuccinates; ester salts with the general formula:

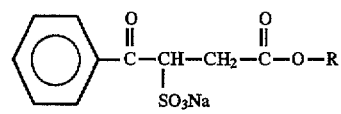

wherein R is an alkyl group having from 1 to 20 carbon atoms; alkaryl sulfonates in which the alkyl groups contain preferably from 10 to 20 carbon atoms, e.g., dodecylbenzenesulfonates, such as sodium dodecylbenzenesulfonate; alkyl phenol sulfonates; sulfonic acids and their salts such as acids with the formula $RSO_3Na$, wherein R is an alkyl and the like; sulfonamides, sulfamido methylenesulfonic acids; rosin acids and their soaps; sulfonated derivatives of rosin and rosin oil; and lignin sulfonates and the like.

Rosin acid soap has been used with good success at a concentration of about 5 percent by weight in the initial charge composition used in the synthesis of carboxylated elastomers. Of rosin acids, about 90 percent are isometric with abietic acid and the other 10 percent is a mixture of dehydro abietic acid and dihydro abietic acid.

Sulfonate surfactants are particularly useful as emulsifying agents (soaps) in the practice of this invention. Sulfonate surfactants are commercially available from a wide variety of sources. For instance, DuPont sells sodium alkylarylsulfonate under the tradename Alkanol™, Browning Chemical Corporation sells sodium dodecylbenzene sulfonates under the tradename Ufaryl™ D1-85 and Ruetgers-Nease Chemical Company sells sodium cumene sulfonate under the tradename Naxonate Hydrotrope™. Some representative examples of sulfonate surfactants which can be used include sodium toluene-xylene sulfonate, sodium toluene sulfonate, sodium cumene sulfonates, sodium decyldiphenylether sulfonate, sodium dodecylbenzenesulfonate, sodium dodecyldiphenylether sulfonate, sodium 1-octane sulfonate, sodium tetradecane sulfonate, sodium pentadecane sulfonate, sodium heptadecane sulfonate and potassium toluene sulfonate.

Metal salts of alkylbenzene sulfonates are a highly preferred class of sulfonate surfactant. The metal will generally be sodium or potassium with sodium being preferred. Sodium salts of alkylbenzene sulfonates have the structural formula:

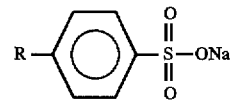

wherein R represents an alkyl group containing from 1 to about 20 carbon atoms. It is preferred for the alkyl group to contain from about 8 to about 14 carbon atoms.

The free radical polymerization technique utilized in this synthesis is normally initiated by including a free radical initiator in the reaction mixture. Virtually, any type of compound capable of generating free radicals can be utilized as the free radical initiator. The free radical generator is normally employed at a concentration within the range of about 0.01 phm to about 1 phm. The free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide and the like; the various azo compounds such as 2-t-butylazo-2-cyanopropane, dimethyl azodiisobutyrate, azodiisobutylronitrile, 2-t-butylazo-1-cyanocyclohexane, 1-t-amylazo-1-cyanocyclohexane and the like, the various alkyl perketals, such as 2,2-bis-(t-butyl-peroxy)butane and the like. Water-soluble peroxygen-free radical initiators are especially useful in such aqueous polymerizations.

The emulsion polymerizations of this invention are typically carried out at a temperature ranging between about 2° C. and about 70° C. At temperatures below 0° C., the aqueous polymerization mixture can freeze and, at temperatures above 70° C., the polymerization reaction becomes difficult to control. It is generally preferred to conduct the polymerization at a temperature which is within the range of about 5° C. to about 50° C. For instance, cold polymerization techniques which employ a polymerization temperature which is within the range of about 5° C. to about 25° C. can be utilized.

In most cases, the polymerization will be continued until a high monomer conversion of at least about 85 percent has been attained. It is normally preferred to allow the polymerization to continue until a monomer conversion of at least about 95 percent has been attained. It is generally most preferred to allow the polymerization to continue until a monomer conversion which is within the range of about 96 percent to about 99 percent has been attained. At this point, the polymerization reaction is shortstopped with a conventional shortstopping agent, such as hydroquinone. A good time to add conventional antioxidants to the latex is after the shortstopping agent has been added.

After addition of an antioxidant into the latex, the highly crosslinked nitrile rubber composition made by the emulsion polymerization process is recovered from the emulsion (latex). This can be accomplished by utilizing standard coagulation techniques. For instance, coagulation can be accomplished by the addition of salts, acids or both to the latex.

A review of coagulation techniques for nitrile rubbers is presented in Hofmann, Werner "Nitrile Rubber," *Rubber Chemistry and Technology*, Vol. 37, No. 2, part 2 (April-June 1964), pp. 94–96, which is incorporated herein by reference. Many of these coagulation techniques will be useful for the highly crosslinked nitrile rubbers of this invention. Coagulation with acid or blends of salts with acids is usually very satisfactory. For example, sulfuric acid, hydrochloric acid, blends of sodium chloride with sulfuric acid and blends of hydrochloric acids with methanol are very effective as coagulating agents for nitrile rubber emulsions. Calcium chloride solutions which are free of calcium hydroxide can also be used as coagulants with good success.

After coagulation, washing may be employed to remove excess soap and/or electrolyte from the rubber. Sometimes washing is also useful in adjusting the pH of the elastomer that has been synthesized. After washing, the elastomer will normally be dewatered and dried.

The highly crosslinked nitrile rubber made by the emulsion polymerization technique of this invention will normally have a gel content of greater than about 90 percent, a swelling index of less than about 10 percent, a mill shrinkage of less than about 10 percent and a Mooney viscosity of about 50 to about 120. The highly crosslinked nitrile rubber will preferably have a gel content of greater than about 95 percent, a swelling index of less than about 7 percent, a mill shrinkage of less than about 8 percent and a Mooney viscosity of about 55 to about 110. The highly crosslinked nitrile rubber will more preferably have a mill shrinkage of less than about 5 percent. For purposes of this patent application, the gel content and swelling index of the highly crosslinked nitrile rubber are determined by ASTM Test Method D3618-88. Mill shrinkage is determined by ASTM Test Method D1917.

It is often advantageous to convert the highly crosslinked nitrile rubber composition into a powder to facilitate its blending with PVC to make plastisol or slush molding compositions. In such cases, it will be beneficial to add a partitioning agent to the highly crosslinked nitrile rubber composition. Some representative examples of partitioning agents which can be employed include calcium carbonate, polyvinyl chloride resin, zinc stearate, calcium stearate and silica.

Plastisols can be prepared by first blending the highly crosslinked nitrile rubber composition with the plasticizer and subsequently mixing the rubber/plasticizer mixture into polyvinylchloride (PVC) and other ingredients utilizing standard mixing techniques. A wide variety of plasticizers which are compatible with the polyvinyl chloride resins can be employed. The plasticizers employed will normally be in the liquid state.

Some representative examples of plasticizers which are highly suitable for this application include abietic derivatives, such as hydroabietyl alcohol, methyl abietate and hydrogenated methyl abietate; acetic acid derivatives, such as cumylphenyl acetate; adipic acid derivatives, such as benzyloctyl adipate, dibutyl adipate, diisobutyl adipate, di-(2-ethylhexyl) adipate, diisononyl adipate, diisooctyl adipate, dinonyl adipate, $C_{7-9}$ linear adipate, dicapryl adipate, octyl decyl adipate (n-octyl, n-decyl adipate), straight chain alcohol adipate, didecyl adipate (diisodecyl adipate), dibutoxyethyl adipate, high molecular weight adipate, polypropylene adipate, modified polypropylene adipate; azelaic acid derivatives, such as dicyclohexyl azelate, di-(2-ethylhexyl) azelate, di-n-hexyl azelate, diisooctyl azelate; benzoic acid derivatives such as diethylene glycol dibenzoate, dipropylene glycol dibenzoate, diethylene glycol benzoate and dipropylene glycol benzoate blend, neopentyl glycol dibenzoate, glyceryl tribenzoate, timethylolethane tribenzoate, pentaerythritol tribenzoate, cumylphenyl benzoate; polyphenyl derivatives such as hydrogenated terphenyl; citric acid derivatives, such as triethyl citrate, tri-n-butyl citrate, acetyl triethyl citrate, acetyl tri-n-butyl citrate, acetal tributyl citrate; epoxy derivatives such as butyl epoxy stearate, alkyl epoxy stearate, epoxidized butyl ester, epoxidized octyl tallage, epoxidized triglyceride, epoxidized soya bean oil, epoxidized sunflower oil, epoxidized linseed oil, epoxidized tallate ester, 2-ethylhexyl-epoxy tallate, octyl epoxy stearate; proprietary esters and mixed ester; ether derivatives, such as cumylphenyl benzyl ether; formal derivatives such as butyl carbitol formal; fumaric acid derivatives, such as dibutyl fumarate, diisooctyl fumarate, dioctyl fumarate; glutaric acid derivatives such as mixed dialkyl glutarates and dicumylphenyl glutarate; glycol derivatives such as diethylene glycol dipelargonate, triethylene glycol dipelargonate, triethylene glycol di-(2-ethylbutyrate), triethylene glycol di-caprylate-caprate, triethylene glycol di-(2-ethylhexoate), triethylene glycol dicaprylate, tetraethylene glycol dicaprylate, polyethylene glycol di-(2-ethylhexoate), butyl phthalyl butyl glycolate, triglycolester of vegetable oil fatty acid, triethylene glycol ester of fatty acid; linear dibasic acid derivatives such as mixed dibasic ester; petroleum derivatives such as aromatic hydrocarbons; isobutyric acid derivatives such as 2,2,4-trimethyl-1,3-pentanediol diisobutyrate; isophthalic acid derivatives such as di(2-ethylhexyl) isophthalate, diisooctyl isophthalate, dioctylisophthalate; lauric acid derivatives such as butyllaurate, 1,2-propylene glycol monolaurate, ethylene glycol monoethyl ether laurate, ethylene glycol monobutyl ether laurate, glycerol monolaurate, polyethylene glycol-400-dilaurate; mellitic acid derivatives such as n-octyl, n-decyl trimellitate, tri-n-octyl-n-decyl trimellitate, triisononyl trimellitate, triisooctyl trimellitate, tricapryl trimellitate, diisooctyl monoisodecyl trimellitate, triisodecyl trimellitate, tri($C_{7-9}$ alkyl) trimellitate, tri-2-ethylhexyl trimellitate; nitrile derivatives such as fatty acid nitrile; oleic acid derivatives such as butyl oleate, 1,2-propylene glycol mono oleate, ethylene glycol monobutyl ether oleate, tetrahydrofurfuryl oleate, glyceryl monoleate; paraffin derivatives such as chlorinated paraffins, diethylene glycol dipelargonate, triethylene glycol dipelargonate, 2-butoxyethyl dipelargonate; phenoxy plasticizers such as acetyl paracumyl phenol; phosphoric acid derivatives such as tri-(2-ethylhexyl) phosphate, tributoxyethyl phosphate, triphenyl phosphate, cresyl diphenyl phosphate, tricresyl phosphate, tri-isopropylphenyl phosphate, alkyl aryl phosphates, diphenyl-xylenyl phosphate, phenyl isopropylphenyl phosphate; phthalic acid derivatives such as alkyl benzene phthalates, dimethyl phthalate, dibutyl phthalate, diisobutyl phthalate, dihexyl phthalate, butyl octyl phthalate, butyl isodecyl phthalate, butyl iso-hexyl phthalate, diisononyl phthalate, dioctyl phthalate, di-(2-ethyl hexyl) phthalate, n-octyl-n-decyl phthalate, hexyl octyl decyl phthalate, didecyl phthalate diisodecyl phthalate, diisodecyl phthalate, diundecyl phthalate, butyl-ethylhexyl phthalate, butylbenzyl phthalate, octylbenzyl phthalate, dicyclohexyl phthalate, diphenyl phthalate, alkylaryl phthalates and 2-ethylhexylisodecyl phthalate; ricinoleic acid derivatives such as methylacetyl ricinoleate, n-butyl acetyl ricinoleate, glyceryl triacetyl ricinoleate; sebacic acid derivatives such as dimethyl sebacate, dibutyl sebacate and dibutoxyethyl sebacate; stearic acid derivatives such as glyceryl tri-acetoxy stearate, butyl acetoxy stearate, methylpentachlorostearate and methoxylethyl acetoxy stearate; sucrose derivatives such as sucrose benzoate; sulfonic acid derivatives such as alkylsulfonic esters of phenol; tall oil derivatives such as methylester of tall oil and isooctyl ester of tall oil; and terephthalic acid derivatives such as dioctyl terephthalate.

The plastisol compositions of this invention can be easily prepared by employing standard mixing procedures. The plastisols of this invention normally contain from about 10 parts by weight to about 30 parts by weight of the highly crosslinked nitrile rubber composition and about 70 parts by weight to about 100 parts by weight of the plasticizer per 100 parts by weight of the polyvinylchloride. It is typically preferred for such rubbery compositions to contain from about 15 to about 25 parts by weight of the highly crosslinked nitrile rubber composition and from about 75 parts by weight to about 90 parts by weight of the plasticizer per 100 parts by weight of the polyvinylchloride.

Slush molding compositions will normally contain from about 10 to about 15 parts by weight of the highly crosslinked nitrile rubber composition and from about 40 parts by weight to about 65 parts by weight of the plasticizer per 100 parts by weight of the polyvinylchloride. It is typically preferred for slush molding compositions to contain from about 12 to about 14 parts by weight of the highly crosslinked nitrile rubber composition and from about 45 parts by weight to about 55 parts by weight of the plasticizer per 100 parts by weight of the polyvinylchloride.

The plastisols and slush molding compositions of this invention will typically contain fillers chiefly to reduce cost. However, fillers also tend to increase paste viscosity, increase yield value (increase the oil absorption properties of the plastisol), increase hardness, lower tensile properties and increase cold and heat flow. Calcium carbonates, clays and silicas are some representative examples of fillers which can be used. Colorants can, of course, also be added to the plastisol or slush molding composition to attain the desired color.

The plastisols and slush molding compositions of this invention can be utilized in conventional dipping and slush molding procedures. In such procedures, the plastisol will normally be fused at a temperature which is within the range of about 150° C. to about 200° C. The plastisol is normally fused at a temperature which is within the range of about 155° C. to about 190° C. To attain a commercially viable rate of fusing and to limit thermal degradation, the fusion will often be carried out at a temperature which is within the range of about 160° C. to about 180° C.

In slush molding procedures, a predetermined amount of the slush molding composition is added to a female mold. The mold is then normally passed through an oven to gel the slush molding composition which is in contact with the sides of the mold. A dumping cycle is sometimes also employed. During the dumping cycle, ungelled slush molding compound from the center portion of the mold (which has not been gelled from contact with the hot sides of the mold) is drained and collected for recycling. After the dumping cycle has been completed, the mold is typically passed through a fusion oven to complete the fusion process. After the fusion process is completed, the mold is cooled and the slush-molded article made is removed from the mold. It should be noted that removal of the molded article is generally easier if the article is still warm. Thus, it may be desirable to remove the molded article from the mold before it is cooled to ambient temperature. In some cases, it may also be desirable to utilize vacuum assistance in removal of the molded article from the mold.

In hot dipping procedures, the substrate being coated is normally heated to an elevated temperature and then submerged in a bath of plastisol to a predetermined height for a predetermined period. Cooling coils are generally utilized in the plastisol bath to counterbalance the heat being brought into the plastisol bath by the heated substrates. Mild agitation is also frequently used to keep components of the plastisol composition, such as fillers, well mixed. After the dipping step has been completed, the substrate is removed from the plastisol bath and excess plastisol is allowed to drip off or is removed mechanically. After the excess plastisol has been removed in the draining step, the plastisol-coated substrate is typically passed through a fusion oven to complete the fusion process. After the fusion step has been completed, the substrate is, of course, allowed to cool to ambient temperature.

Cold dipping processes are used in cases where the substrate being coated cannot be preheated. In such cold dipping processes, the substrate is simply dipped into the plastisol bath to a predetermined height without being preheated. In such cold dipping precesses, the rheology of the plastisol paste is adjusted to control the weight of the plastisol pocked up and the coating thickness. Plastisol formulations for use in cold dipping operations accordingly rely upon yield building materials, such as silicas, clays or magnesium organic derivatives, to control coating thickness. After being coated with the desired quantity of plastisol, the substrate is removed from the plastisol bath and is heated to bring about the fusion process. This is typically done by passing the substrate through a fusion oven. After the fusion step has been completed, the substrate is, of course, allowed to cool to ambient temperature.

This invention is illustrated by the following examples which are merely for the purpose of illustration and are not to be regarded as limiting the scope of this invention or the manner in which it can be practiced. For example, the so-called "core-shell" emulsion polymerization technique or graft emulsion polymerization technique could be used instead of the one-stage conventional emulsion polymerization technique described heretofore. Unless specifically indicated otherwise, all parts and percentages are given by weight.

EXAMPLE 1

In this experiment, a highly crosslinked nitrile rubber was made by using "cold" emulsion polymerization utilizing the techniques of this invention. The polymerization was conducted in a stirred, jacketed reactor having a capacity of 5 liters.

The reactor was charged with 2531 g (grams) of water, 28.6 g of a fatty soap, 2.6 g of $Na_3PO_4$ and 0.44 g of an iron/sodium EDTA complex salt. Then 429 g of acrylonitrile, 1.3 g of t-dodecylmercaptan, 22.75 g of trimethylolpropanetrimethacrylate and 1.04 g of cumene hydroperoxide were charged into the reactor. The reactor was then evacuated and cooled to a temperature of 10° C. Then 871 g of 1,3-butadiene was added followed by 0.52 g of sodium formaldehyde sulfoxylate.

A temperature of about 10° C. was maintained throughout the polymerization. When a monomer conversion of 95 percent was achieved, the reaction was shortstopped by the addition of 0.56 g of diethylhydroxylamine and 9.5 g of sodium dimethyldithiocarbamate. Residual monomers were then removed and the final latex was stabilized with ditertiarybutyl paracresol.

The latex was then coagulated by the addition of an aqueous solution of calcium chloride. The rubber crumb which was recovered was then washed with water and dried at a temperature of 55° C. The crumb rubber was then mixed with PVC emulsion or calcium carbonate (as a partitioning agent) and ground to obtain a free-flowing powder.

EXAMPLE 2

In this experiment, a highly crosslinked nitrile rubber was synthesized by utilizing the same process described in Example 1, except that 494 grams of acrylonitrile, 9.1 grams of tertiary dodecyl mercaptan, 22.75 grams of trimethylolpropanetrimethacrylate and 1.04 grams of cumene hydroperoxide were charged into the reactor. The reactor was then evacuated and cooled to a temperature of 10° C. Then 806 grams of 1,3-butadiene was added, followed by the addition of 0.52 grams of sodium formaldehyde sulfoxylate.

A temperature of about 10° C. was maintained throughout the polymerization. When a monomer conversion of 88 percent was achieved, the reaction was shortstopped by the addition of 0.56 grams of diethylhydroxylamine and 9.5 grams of sodium dimethyldithiocarbamate. Residual monomers were then removed and the final latex was stabilized by the addition of Wingstay® L antioxidant. The latex was then coagulated by the addition of an aqueous solution of magnesium sulfate. The rubber crumb which was recovered was then washed with water and dried at a temperature of 55° C. The crumb rubber was then mixed with PVC emulsion or calcium carbonate (as a partitioning agent) and ground to a free-flowing powder.

EXAMPLE 3

In this experiment, a plastisol composition was made utilizing the highly crosslinked nitrile rubber made in Example 1. In the first step of this experiment, Wingstay® K antioxidant and the highly crosslinked nitrile rubber were mixed into dioctylphtalate (DOP) plasticizer at 25°–80° C. The mixture of highly crosslinked nitrile rubber and plasticizer was then mixed into PVC to form a paste of plastisol. The plastisol made by this procedure contained about 20 parts of the highly crosslinked nitrile rubber, about 0.2 parts of antioxidant, about 3 parts of stabilizer, about 85 parts of DOP and about 100 parts of PVC.

The plastisol made by this technique proved to have a viscosity which was satisfactory for coating substrates by dipping. Products made utilizing this plastisol composition exhibited improved fluid resistance and compression set characteristics. In the dipping process, improved sag resistance was also realized. During the fusing step, improved dimensional stability was also experienced prior to completion of the gelification process. Thus, the plastisols of this invention exhibit both improved processing characteristics as well as improved physical characteristics for the final product.

EXAMPLE 4

In this experiment, a slush molding composition in the form of a free flowing powder was made utilizing the highly crosslinked nitrile rubber synthesized in Example 2. The free-flowing NBR powder was then mixed into DOP at a temperature of 50° C.–80° C. by stirring.

A stabilizer was separately mixed into porous PVC resin using a high speed Henschel mixer which was operated at 800 rpm. The mixing was continued until the temperature of the mixture reached 80° C. to 100° C. Then the mixture of NBR in DOP was slowly added to the Henschel mixer containing the porous PVC. The temperature of the mixture increased to as high as 110° C. due to particle friction. At this point in the process, the blend in the Henschel mixer contained about 12 parts of the NBR, about 0.2 parts of antioxidant, about 50 parts of DOP, about 3 parts of stabilizer and about 100 parts of PVC. Then, about 4 parts of a fine powdered dispersion grade non-porous PVC resin was added to the blend in the Henschel mixer to further improve the flow characteristics of the plasticized PVC powder. The temperature was then reduced to about 50° C. and a free-flowing slush molding powder composition was recovered.

The free-flowing slush molding powder was dry to the touch and exhibited excellent characteristics for slush molding applications. Products made utilizing this slush molding composition exhibited improved fluid resistance and tear resistance. Thus, the slush molding compositions of this invention exhibit both improved processing characteristics due to being in the form of a free flowing powder and produce finished products having improved physical characteristics.

While certain representative embodiments and details have been shown for the purpose of illustrating the subject invention, it will be apparent to those skilled in this art that various changes and modifications can be made therein without departing from the scope of the subject invention.

What is claimed is:

1. A process for applying a rubbery coating to a substrate which comprises: (1) dipping the substrate into a plastisol composition which is comprised of (a) polyvinyl chloride, (b) from about 70 to about 100 parts of a plasticizer per 100 parts of the polyvinylchloride, (c) from about 1 to about 3 parts of a stabilizer per 100 parts of polyvinyl chloride and (d) from about 10 to about 30 parts of a highly crosslinked nitrile rubber composition per 100 parts of the polyvinyl chloride, wherein the highly crosslinked nitrile rubber has repeat units which are derived from (i) 1,3-butadiene, (ii) acrylonitrile and (iii) a crosslinking agent, and wherein said highly crosslinked nitrile rubber has a Mooney viscosity of about 50 to about 120, a swelling index of less than about 10 percent, a mill shrinkage of less than 10 percent and a gel content of greater than 90 percent in a manner whereby the plastisol composition is applied to the surface of the substrate; (2) removing the substrate from the plastisol composition to produce a plastisol coated substrate; and (3) heating the plastisol-coated substrate to a temperature which is within the range of about 150° C. to about 200° C. for a period which is sufficient to fuse the plastisol composition to the substrate producing a rubber-coated substrate.

2. A process for applying a rubbery coating to a substrate which comprises: (1) dipping the substrate into a bath of a plastisol composition which is comprised of (a) polyvinyl chloride, (b) from about 70 to about 100 parts of a plasticizer per 100 parts of the polyvinylchloride, (c) from about 1 to about 3 parts of a stabilizer per 100 parts of polyvinyl chloride and (d) from about 10 to about 30 parts of a highly crosslinked nitrile rubber composition per 100 parts of the polyvinyl chloride, wherein the highly crosslinked nitrile rubber has repeat units which are derived from (i) 1,3-butadiene, (ii) acrylonitrile and (iii) a crosslinking agent, and wherein said highly crosslinked nitrile rubber has a Mooney viscosity of about 50 to about 120, a swelling index of less than about 10 percent, a mill shrinkage of less than 10 percent and a gel content of greater than 90 percent in a manner whereby the plastisol composition come into contact with a hot surface of the substrate; (2) allowing the plastisol to remain in contact with the hot surface of the substrate for a period which is sufficient to fuse the plastisol composition to the substrate producing a rubber-coated substrate; (3) removing the rubber-coated substrate from the plastisol bath; and (4) allowing the rubber-coated substrate to cool to ambient temperature after the desired degree of fusing has been attained.

3. A process for applying a rubbery coating to a substrate as specified in claim 2 wherein the rubber-coated substrate from step (3) is maintained at a temperature which is within the range of about 150° C. to about 200° C. until the desired degree of fusing has been attained.

4. A process for applying a rubbery coating to a substrate as specified in claim 3 wherein the repeat units in the highly crosslinked nitrile rubber are derived from (i) about 45 weight percent to about 79 weight percent 1,3-butadiene, (ii) from about 20 weight percent to about 50 weight percent acrylonitrile and (iii) from about 0.5 weight percent to about 5 weight percent of the crosslinking agent.

5. A process for applying a rubbery coating to a substrate as specified in claim 4 wherein the highly crosslinked nitrile rubber has a gel content of greater than about 95 percent, a swelling index of less than about 7 percent, a mill shrinkage of less than about 8 percent and a Mooney viscosity of about 55 to about 110.

6. A process for applying a rubbery coating to a substrate as specified in claim 5 wherein the crosslinking agent is trimethylol propane trimethacrylate.

7. A process for applying a rubbery coating to a substrate as specified in claim 5 wherein the crosslinking agent is selected from the group consisting of ethylene glycol methacrylate, trimethylol propane trimethacrylate, divinylbenzene and 1,4-butanediol dimethacrylate.

8. A process for applying a rubbery coating to a substrate as specified in claim 5 wherein the repeat units in the highly crosslinked nitrile rubber are derived from (i) about 58 weight percent to about 71 weight percent 1,3-butadiene, (ii) from about 28 weight percent to about 38 weight percent acrylonitrile and (iii) from about 1 weight percent to about 4 weight percent of the crosslinking agent.

9. A process for applying a rubbery coating to a substrate as specified in claim 8 wherein the highly crosslinked nitrile rubber has a mill shrinkage of less than about 5 percent.

10. A process for applying a rubbery coating to a substrate as specified in claim 9 wherein the repeat units in the highly crosslinked nitrile rubber are derived from about 1.5 weight percent to about 3.5 weight percent of the crosslinking agent.

11. A process for applying a rubbery coating to a substrate as specified in claim 3 wherein the plastisol composition contains from about 15 to about 25 parts by weight of the highly crosslinked nitrile rubber composition and from about 75 parts by weight to about 90 parts by weight of the plasticizer per 100 parts by weight of the polyvinylchloride.

12. A process for applying a rubbery coating to a substrate as specified in claim 11 wherein the rubber-coated substrate from step (3) is maintained at a temperature which is within the range of about 155° C. to about 190° C. until the desired degree of fusing has been attained.

13. A process for applying a rubbery coating to a substrate as specified in claim 11 wherein the rubber-coated substrate from step (3) is maintained at a temperature which is within the range of about 160° C. to about 180° C. until the desired degree of fusing has been attained.

14. A process for applying a rubbery coating to a substrate as specified in claim 8 wherein the highly crosslinked nitrile rubber is prepared by utilizing a cold emulsion polymerization technique which employs a polymerization temperature which is within the range of about 5° C. to about 25° C.

15. A process for applying a rubbery coating to a substrate as specified in claim 1 wherein the repeat units in the highly crosslinked nitrile rubber are derived from (i) about 45 weight percent to about 79 weight percent 1,3-butadiene, (ii) from about 20 weight percent to about 50 weight percent acrylonitrile and (ii) from about 0.5 weight percent to about 5 weight percent of the crosslinking agent.

16. A process for applying a rubbery coating to a substrate as specified in claim 15 wherein the highly crosslinked nitrile rubber has a gel content of greater than about 95 percent, a swelling index of less than about 7 percent, a mill shrinkage of less than about 8 percent and a Mooney viscosity of about 55 to about 110.

17. A process for applying a rubbery coating to a substrate as specified in claim 16 wherein the crosslinking agent is trimethylol propane trimethacrylate.

18. A process for applying a rubbery coating to a substrate as specified in claim 16 wherein the crosslinking agent is selected from the group consisting of ethylene glycol methacrylate, trimethylol propane trimethacrylate, divinylbenzene and 1,4-butanediol dimethacrylate.

19. A process for applying a rubbery coating to a substrate as specified in claim 18 wherein the repeat units in the highly crosslinked nitrile rubber are derived from (i) about 58 weight percent to about 71 weight percent 1,3-butadiene, (ii) from about 28 weight percent to about 38 weight percent acrylonitrile and (iii) from about 1 weight percent to about 4 weight percent of the crosslinking agent; and wherein the highly crosslinked nitrile rubber has a mill shrinkage of less than about 5 percent.

20. A process for applying a rubbery coating to a substrate as specified in claim 19 wherein the repeat units in the highly crosslinked nitrile rubber are derived from about 1.5 weight percent to about 3.5 weight percent of the crosslinking agent.

* * * * *